US008230366B2

(12) United States Patent
Chaudhri

(10) Patent No.: US 8,230,366 B2
(45) Date of Patent: Jul. 24, 2012

(54) DYNAMICALLY CHANGING CURSOR FOR USER INTERFACE

(75) Inventor: Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1047 days.

(21) Appl. No.: 10/690,611

(22) Filed: Oct. 23, 2003

(65) Prior Publication Data

US 2005/0088410 A1 Apr. 28, 2005

(51) Int. Cl.
*G06F 3/048* (2006.01)

(52) U.S. Cl. ........ 715/859; 715/708; 715/711; 715/715; 715/754; 715/837; 715/856

(58) Field of Classification Search .................. 715/856, 715/859, 754, 861, 711, 708, 715, 808, 837
See application file for complete search history.

(56) References Cited

U.S. PATENT DOCUMENTS

| | | | | |
|---|---|---|---|---|
| 4,661,810 A | * | 4/1987 | Himelstein et al. | 715/860 |
| 4,984,152 A | * | 1/1991 | Muller | 715/856 |
| 5,091,866 A | * | 2/1992 | Takagi | 715/803 |
| 5,146,212 A | * | 9/1992 | Venolia | 715/861 |
| 5,333,256 A | | 7/1994 | Green et al. | |
| 5,371,844 A | * | 12/1994 | Andrew et al. | 715/747 |
| 5,423,039 A | * | 6/1995 | Matteson | 718/107 |
| 5,428,733 A | * | 6/1995 | Carr | 715/809 |
| 5,434,965 A | * | 7/1995 | Matheny et al. | 715/710 |
| 5,448,695 A | * | 9/1995 | Douglas et al. | 715/809 |
| 5,461,710 A | * | 10/1995 | Bloomfield et al. | 715/839 |
| 5,479,602 A | * | 12/1995 | Baecker et al. | 715/838 |
| 5,495,604 A | * | 2/1996 | Harding et al. | 707/690 |
| 5,530,865 A | * | 6/1996 | Owens et al. | 719/313 |
| 5,570,281 A | * | 10/1996 | Berry | 700/17 |
| 5,572,641 A | | 11/1996 | Kuo | |
| 5,586,243 A | * | 12/1996 | Barber et al. | 715/856 |
| 5,590,264 A | * | 12/1996 | Keane et al. | 715/838 |
| 5,596,694 A | | 1/1997 | Capps | |
| 5,687,331 A | | 11/1997 | Volk et al. | |
| 5,717,426 A | * | 2/1998 | Ohkado | 345/157 |
| 5,745,719 A | * | 4/1998 | Falcon | 715/856 |
| 5,760,773 A | * | 6/1998 | Berman et al. | 715/808 |

(Continued)

OTHER PUBLICATIONS

Alan Simpson, Windows 95 Uncut, 1995, IDG Books Worldwide, pp. 31, 32, 57, 115, 134, 137, 138, 139, 246.*

(Continued)

*Primary Examiner* — Boris Pesin
*Assistant Examiner* — John Heffington
(74) *Attorney, Agent, or Firm* — Buchanan Ingersoll & Rooney PC

(57) ABSTRACT

A dynamic cursor for a computer graphical user interface changes according to the processing state of applications over which the cursor is located, or with respect to an operating system element. A normal cursor is displayed when either the operating system element, or an application over which the cursor is located, can be accessed in a normal manner. A standard wait cursor is displayed over busy applications that require a user to wait until interacting with the application, when the application is active in the foreground of the computer system. When the application is busy and operating in the background, a hybrid wait cursor is displayed that indicates to the user the busy state of the application and the user's ability to interact with operating system elements or other applications regardless of this busy state. Other forms of hybrid cursors are disclosed that indicate the results of a drag operation, and quantitative data pertaining to objects being dragged.

41 Claims, 7 Drawing Sheets

U.S. PATENT DOCUMENTS

| | | | | |
|---|---|---|---|---|
| 5,777,615 | A * | 7/1998 | Barber et al. | 715/856 |
| 5,801,698 | A * | 9/1998 | Lection et al. | 715/861 |
| 5,801,704 | A * | 9/1998 | Oohara et al. | 715/856 |
| 5,880,729 | A | 3/1999 | Johnston, Jr. et al. | |
| D407,698 | S | 4/1999 | Alexiev | |
| 5,898,432 | A * | 4/1999 | Pinard | 715/861 |
| 5,973,686 | A * | 10/1999 | Shimogori | 715/746 |
| 5,978,816 | A * | 11/1999 | Sakaguchi et al. | 715/207 |
| 5,982,350 | A * | 11/1999 | Hekmatpour et al. | 345/629 |
| 5,986,656 | A | 11/1999 | Crutcher et al. | |
| 5,995,079 | A * | 11/1999 | Sheasby et al. | 715/856 |
| 6,016,146 | A * | 1/2000 | Beer et al. | 715/825 |
| D425,497 | S | 5/2000 | Eisenberg et al. | |
| 6,067,085 | A * | 5/2000 | Modh et al. | 715/711 |
| 6,097,390 | A * | 8/2000 | Marks | 715/772 |
| 6,100,871 | A * | 8/2000 | Min | 715/861 |
| 6,112,214 | A * | 8/2000 | Graham et al. | 715/212 |
| 6,140,996 | A * | 10/2000 | Nobutani et al. | 715/856 |
| 6,208,376 | B1 * | 3/2001 | Tanaka et al. | 348/153 |
| 6,246,411 | B1 * | 6/2001 | Strauss | 715/863 |
| 6,278,443 | B1 * | 8/2001 | Amro et al. | 345/173 |
| 6,337,702 | B1 * | 1/2002 | Bates et al. | 715/857 |
| 6,353,452 | B1 * | 3/2002 | Hamada et al. | 715/825 |
| 6,366,299 | B1 * | 4/2002 | Lanning et al. | 715/738 |
| 6,468,085 | B1 * | 10/2002 | Bergan et al. | 434/236 |
| 6,507,349 | B1 * | 1/2003 | Balassanian | 345/676 |
| 6,563,514 | B1 * | 5/2003 | Samar | 715/711 |
| 6,606,101 | B1 * | 8/2003 | Malamud et al. | 715/715 |
| D487,275 | S | 3/2004 | Ording et al. | |
| 6,809,720 | B2 * | 10/2004 | Malamud et al. | 345/157 |
| 6,865,719 | B1 * | 3/2005 | Nicholas, III | 715/856 |
| 6,874,126 | B1 * | 3/2005 | Lapidous | 715/711 |
| 6,883,145 | B2 * | 4/2005 | Jaeger | 715/767 |
| D506,208 | S | 6/2005 | Jewitt et al. | |
| 6,917,373 | B2 | 7/2005 | Vong et al. | |
| D508,248 | S | 8/2005 | Ording | |
| 6,948,126 | B2 * | 9/2005 | Malamud et al. | 715/715 |
| D521,017 | S | 5/2006 | Jewitt et al. | |
| D525,265 | S | 7/2006 | Rozier | |
| 7,089,256 | B2 * | 8/2006 | Smialek | 717/104 |
| 7,240,300 | B2 * | 7/2007 | Jaeger | 715/863 |
| D563,978 | S | 3/2008 | Leute et al. | |
| D563,979 | S | 3/2008 | Viegers et al. | |
| 7,441,233 | B1 * | 10/2008 | Orndorff et al. | 717/125 |
| 7,549,132 | B2 * | 6/2009 | Petri | 715/859 |
| 7,554,521 | B1 * | 6/2009 | Migos et al. | 345/156 |
| 7,594,168 | B2 * | 9/2009 | Rempell | 715/234 |
| 7,765,486 | B2 * | 7/2010 | Jaeger | 715/764 |
| 8,002,707 | B2 * | 8/2011 | Ooshima | 600/438 |
| 8,006,183 | B1 * | 8/2011 | Peebler | 715/711 |
| 8,056,008 | B2 * | 11/2011 | Castrucci | 715/715 |
| 2002/0010626 | A1 * | 1/2002 | Agmoni | 705/14 |
| 2002/0054172 | A1 * | 5/2002 | Berman et al. | 345/856 |
| 2002/0057285 | A1 * | 5/2002 | Nicholas, III | 345/700 |
| 2002/0075199 | A1 * | 6/2002 | Asahi et al. | 345/1.1 |
| 2002/0109737 | A1 * | 8/2002 | Jaeger | 345/863 |
| 2003/0142123 | A1 * | 7/2003 | Malamud et al. | 345/715 |
| 2003/0162569 | A1 * | 8/2003 | Arakawa et al. | 455/566 |
| 2003/0210260 | A1 * | 11/2003 | Palmer et al. | 345/715 |
| 2004/0056896 | A1 * | 3/2004 | Doblmayr et al. | 345/769 |
| 2004/0056904 | A1 * | 3/2004 | Jaeger | 345/853 |
| 2004/0205514 | A1 | 10/2004 | Sommerer et al. | |
| 2004/0205633 | A1 | 10/2004 | Martinez et al. | |
| 2005/0034080 | A1 * | 2/2005 | Jaeger | 715/767 |
| 2005/0071761 | A1 * | 3/2005 | Kontio | 715/711 |
| 2005/0071772 | A1 * | 3/2005 | Jaeger | 715/767 |
| 2005/0183027 | A1 * | 8/2005 | Jaeger | 715/767 |
| 2005/0190147 | A1 * | 9/2005 | Kim | 345/156 |
| 2005/0246664 | A1 * | 11/2005 | Michelman et al. | 715/856 |
| 2006/0069617 | A1 | 3/2006 | Milener et al. | |
| 2006/0132460 | A1 * | 6/2006 | Kolmykov-Zotov et al. | 345/173 |
| 2006/0179408 | A1 * | 8/2006 | Ko | 715/715 |
| 2006/0221082 | A1 * | 10/2006 | Rifkin | 345/473 |
| 2008/0068335 | A1 * | 3/2008 | Arakawa et al. | 345/156 |
| 2008/0104526 | A1 * | 5/2008 | Jaeger | 715/763 |
| 2008/0104527 | A1 * | 5/2008 | Jaeger | 715/763 |
| 2008/0104571 | A1 * | 5/2008 | Jaeger | 717/113 |
| 2009/0222728 | A1 * | 9/2009 | Ko | 715/715 |
| 2010/0070900 | A1 * | 3/2010 | Cummins et al. | 715/769 |
| 2010/0313153 | A1 * | 12/2010 | Jaeger | 715/764 |

OTHER PUBLICATIONS

Brian Livingston and Davis Straub, Windows 95 Secrets, 1995m IDG Books Worldwide, Inc., Third Edition, pp. 612-615.*

Paul Blenkhorn, David Gareth Evans and Alex Baude, Full-Screen Magnification for Windows Using DirectX Overlays, Dec. 2002, IEEE, pp. 225-231.*

Sagman, Microsoft Office XP ® for Windows: Visual QuickStart Guide, Peachpit Press, ISBN: 0-201-74147-4, chapter 2, level 1, section 4, Dragging and Dropping Text).*

International Business Machines Corporation, Research Disclosure 421100, Visual indication of system-versus-application 'busy' modality, May 1999, Kenneth Mason Publications.*

Sagman, Microsoft Office XP for Windows: Visual QuickStart, Jul. 26, 2001, Peachpit Press.*

International Business Machines, Visual indication of system-versus-application 'busy' modality, 1999.* eHow, Mouse Pointer, http://www.ehow.co.uk/mouse-pointed, 1999-2012.*

Ask Search, http://www.ask.com/web?qsrc=1&o=0&I=dir&q=user+switch+information+mouse+pointer.*

Ask Search, http://www.ask.com/web?qsrc=1&o=0&I=dir& q=user+switch+information+%28mouse+po . . . .*

Ask Search, http://www.ask.com/web?q= user+switch+information+cursor&qsrc=0&o=0&I=dir.*

Research Disclosure, "Animated Icons," Sep. 1989.

Richard A. Bolt, "Human Interfaces for Managers," Computerworld In Depth, Jul. 16, 1984, pp. 1 to 18.

Herot et al. "A Prototype Spatial Data Management System," Computer Graphics Quarterly Report of SIGGRAPH-ACM, Jul. 1980, pp. 63-70.

* cited by examiner

DYNAMICALLY CHANGING CURSOR FOR USER INTERFACE

FIELD OF THE INVENTION

The present invention relates to computer user interfaces, particularly graphical user interfaces. More specifically, the present invention relates to a dynamically changing cursor within a graphical user interface environment to assist the user in determining the state of a given application or action being performed.

BACKGROUND OF THE INVENTION

One important aspect of any computer system is the interface that allows a user to input commands and data, and to receive the results of operations performed within the computer. One common type of user interface that has enjoyed increased success in the personal computer arena is the graphical user interface (GUI). GUIs provide users with an easy-to-use interface to complex computer file systems. For example, a user can access documents and applications stored in a computer system by way of icons that function as graphical representations of files, and the directories in which they are stored.

Several pointing devices have been developed to facilitate a user's ability to interact with icons, to access information within the computer's file system. Some examples of pointing devices or cursor control devices that provide a user with a physical interface to the computer's resources include an electronic stylus, a mouse, a trackball, or the like. Such devices allow the user to manipulate a cursor within a virtual desktop environment, or other GUI, to interact with files or applications of the computer system.

Typically, the cursor controlled by a such a device is displayed in the form of a pointer or arrow. The appearance of this cursor can be varied to convey certain information to the user. For example, the cursor can change shape from a pointer to a text-insertion-point cursor when the user moves the cursor over editable text, or text entry fields. Additionally, a cursor can take on different appearances depending upon functionalities offered by various applications currently running on the computer system. For example, if a user is allowed to magnify a certain portion of the computer screen, the cursor might appear in the form of a magnifying glass. The ability to scroll a document with the cursor control device might be indicated by displaying the cursor in the form of a hand, which appears to grab a page of the document and reposition that page in response to movement of the cursor control device. Likewise, when using graphics applications, a user may be presented with a variety of different drawing tools depending upon the desired functionality to be provided by the cursor control device. For example, the cursor might be displayed in the form of a pencil, a paintbrush, a spray paint can, "cross-hairs" for drawing simple geometric shapes, or any other shape that conveys helpful information to a user.

In addition to changing the cursor in response to functionality offered by various applications, the cursor may be changed in response to commands or status information from the operating system or its interface. One common example of such a cursor change occurs when the operating system communicates to the user that the system is busy. For example, an operating system might change the cursor so that it appears to be a watch, indicating to the user that the system is busy and requires time to complete current processing operations. Various operating systems make use of different cursor shapes that accomplish the same objective, such as an hour glass, a rotating pinwheel, or the like. The exact appearance of the cursor may vary, but the information communicated to the user is the same; namely, a time-out situation has occurred while the system is busy processing operations.

These prior approaches conveyed some information to the user regarding an operation to be performed or the processing state of the computer, and it is desirable to expand upon this ability to provide the user with information regarding a current operation. For example, a user running a number of applications might see the "busy" cursor, or "wait" cursor, which would cause that user to wait for the computer to return to a normal processing state from its current busy state. The user might be discouraged from attempting to access other applications, thinking that the wait cursor indicated that the entire computer operating system was in a busy state. However, this may not be the case, and only the current application might be in a busy state. This becomes especially problematic when an error occurs, causing the current application to become "hung," or permanently stalled. In such an instance, the user might wait for extended periods of time, losing productivity and experiencing increasing levels of aggravation, because of the inability for the operating system to convey to the user that only the current application is busy, and that the user may access other applications or operating system commands immediately if desired.

Another situation in which it is useful to provide the user with meaningful feedback is in the context of move and copy operations. For instance, when a user drags a file to a destination, the result of that dragging operation may depend on the relationship of the source and destination locations. If the file is dragged from one folder on the desktop to another folder on the desktop, the file might be moved between the two folders, whereas if the file is dragged from a desktop folder to a floppy disk or network drive, it might be copied at the destination location. If the user intended to copy the file at the destination, but only ended up moving it, frustration could ensue when the user looks for the file at the original location. It is therefore helpful to provide the user with an indication whether the dragging operation will result in a move or a copy before it is completed.

Often, a user might drag several files to a destination having limited capacity, e.g. a floppy disk. The user may not be aware of the fact that the cumulative size of the files exceeds the capacity of the storage disk, until after the copy operation has commenced, and an error message is generated. In such a case, the user may need to remove some of the files that were copied onto the disk, in order to make room for other, uncopied files which may have a higher priority.

The foregoing examples are illustrative of some of the situations in which it is desirable to provide the user with feedback regarding the current state of the computer and/or the result of an operation before it is completed. The present invention is directed to the use of the cursor to provide such feedback.

SUMMARY OF THE INVENTION

In accordance with one aspect of the present invention, a "hybrid" cursor is employed to provide dynamic feedback for a number of different situations. The conventional cursor comprises a pointer arrow with a tail. In the hybrid cursor, the tail portion is replaced with an indicator that provides feedback regarding the current operation being carried out with the cursor, and/or the location of the cursor. Examples of this feedback include the number of files being dragged, an indicator that the dragged files will be copied or deleted, or the busy state of an application over which the cursor is positioned. Furthermore, a modifier key can be employed to change the information being provided. As an example, the modifier can change the identification of the number of files being dragged to the cumulative size of those files. The shape of the cursor can vary dynamically as needed to accommodate the amount of data being presented to the user.

Further features of the invention, and the advantages offered thereby, are explained in greater detail hereinafter with reference to specific embodiments illustrated in the accompanying drawings, wherein like elements are designated by like identifiers.

BRIEF DESCRIPTION OF THE DRAWING FIGURES

DETAILED DESCRIPTION OF THE INVENTION

To facilitate an understanding of the principles and features of the present invention, it is explained hereinafter with reference to its implementation in an illustrative embodiment. In particular, the invention is described in the context of a user interface associated with the Macintosh Operating System (Mac OS®), available from Apple Computer, Inc. It will be appreciated, however, that this is not the only embodiment in which the present invention can be implemented. Rather, it can find utility in a variety of user interface systems, as will become apparent from an understanding of the principles that underscore the invention.

Figure 1:
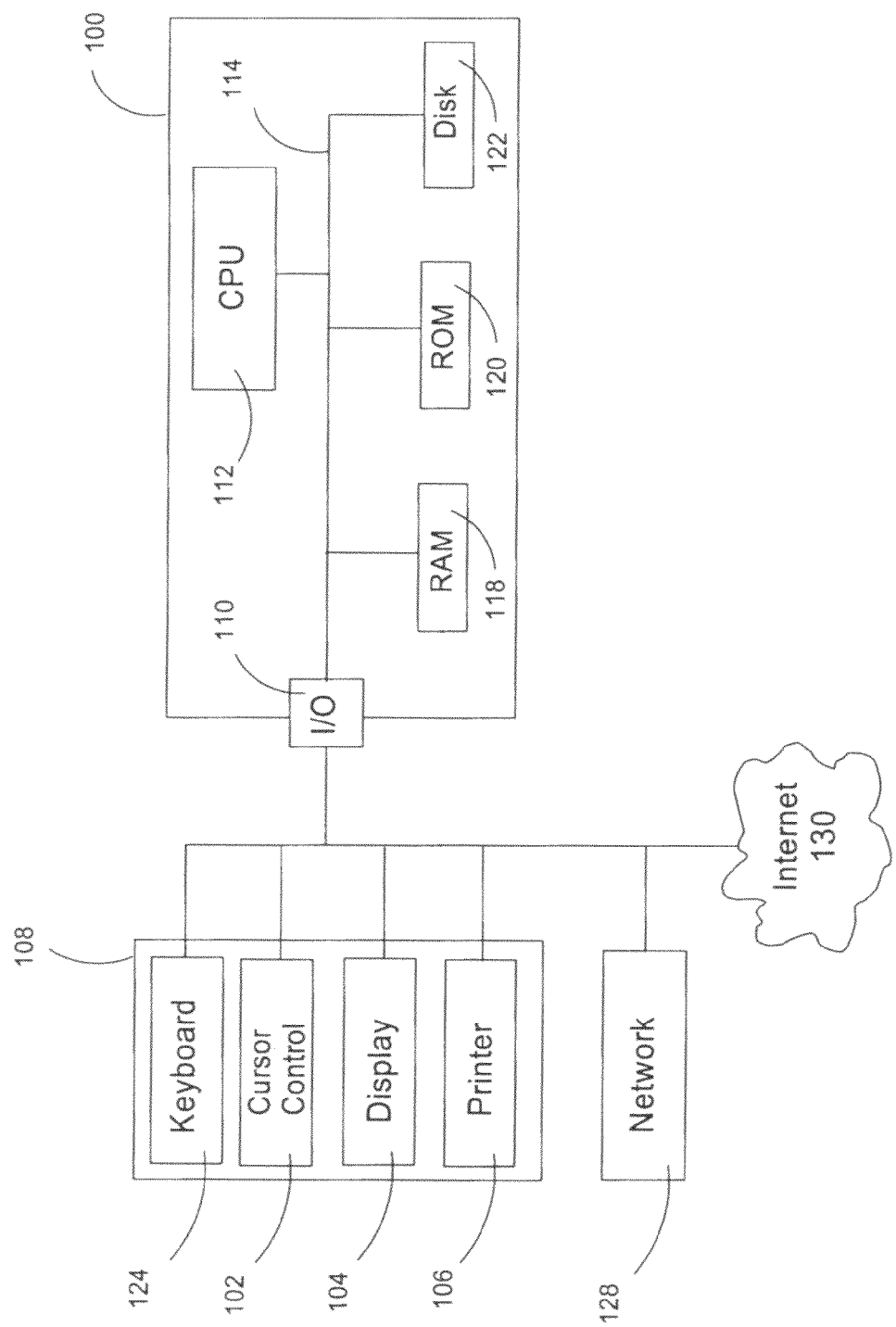
FIG. 1 is a block diagram of an exemplary computer system in which the present invention can be implemented.

An exemplary computer system of the type in which the present invention can be employed is illustrated in block diagram form in FIG. 1. The structure of the computer itself can be of a conventional type, and is briefly described here for subsequent understanding of the manner in which the features of the invention cooperate with the structure of the computer.

Referring to FIG. 1, the system includes a computer 100 having a variety of external peripheral devices 108 connected thereto. The computer 100 includes a central processing unit 112, a main memory which is typically implemented in the form of a random access memory 118, a static memory that can comprise a read only memory 120, and a permanent storage device, such as a magnetic or optical disk 122. The CPU 112 communicates with each of these forms of memory through an internal bus 114. Additionally, other types of memory devices may be connected to the CPU 112 via the internal bus 114. The peripheral devices 108 include a data entry device such as a keyboard 124, and a pointing or cursor control device 102 such as a mouse, trackball or the like. A display device 104, such as a CRT monitor or an LCD screen, provides a visual display of the information that is being processed within the computer, for example windows associated with application programs. A hard copy of this information can be provided through a printer 106, or similar device. Each of these external peripheral devices communicates with the CPU 112 by means of one or more input/output ports 110 on the computer. Input/output ports 110 also allow computer 100 to interact with a local area network (LAN) server or an external network 128, such as a VLAN, WAN, or the Internet 130.

The computer 100 typically includes an operating system, which controls the allocation and usage of the hardware resources such as memory, central processing unit time, disk space, and peripheral devices. The operating system also controls the ability to generate windows and other graphics on the computer's display device 104. For example, the operating system may provide a number of windows to be displayed on the display device 104 associated with each of the programs running in the computer's RAM 118. Depending upon the operating system, these windows may be displayed in a variety of manners, in accordance with themes associated with the operating system and particular desired display effects associated with the operating system.

Figure 2:
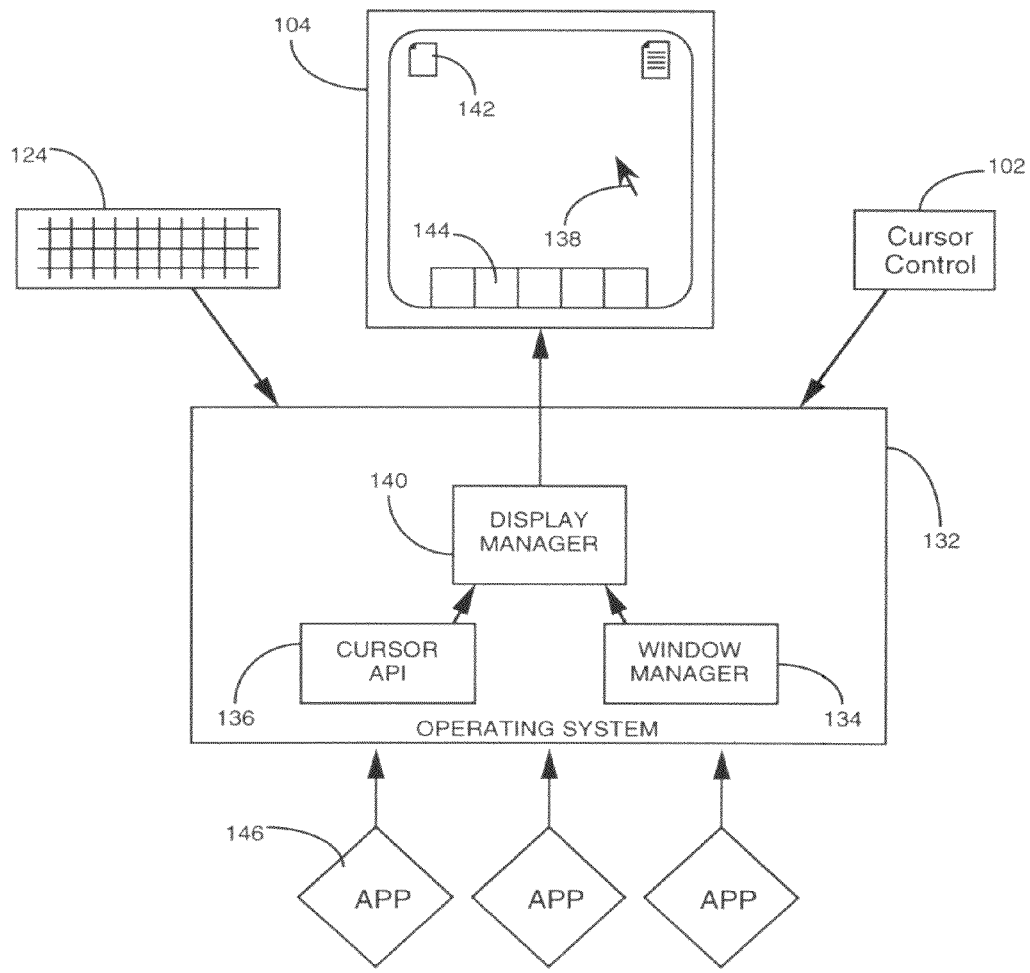
FIG. 2 is a block diagram illustrating some of the software components of the computer system.

FIG. 2 is a block diagram illustrating the relationship of some of the components of the operating system and the hardware elements of the computer system. Generally, the graphical user interface forms part of the computer's operating system 132. The graphical user interface employs various services of the operating system that are responsible for generating information that appears on the display 104. These services include a window manager 134, which controls the appearance, size and position of windows that appear on the display, and a cursor API 136, that controls the location and appearance of a cursor 138. Each of these services communicates with a display manager 140 that also forms part of the operating system. The display manager is responsive to commands received from the windows manager and the cursor API, and generates the signals that control the display 104 to present designated images. Further, the display manager is responsive to input from the cursor control device 102 to display the cursor 138 at the appropriate location on the display screen.

Figure 3A:
FIG. 3A is a diagram illustrating a normal pointer cursor.

Various types of cursor images can be associated with the cursor control device 102. These images might be stored, for example, in a table associated with the cursor API 136. FIG. 3A shows a normal, pointer cursor 200 that is controlled via a mouse or other cursor control device. As is conventional, the cursor contains a pointer arrow with a tail portion. By way of this normal cursor 200, the user may select and/or manipulate elements within the computer system's graphical user interface (GUI). For instance in a GUI that utilizes a computer desktop motif such as that depicted in FIG. 2, a user may select icons 142, such as folder icons or file icons, which represent directories and files stored within the computer's storage device 122. Additionally, the normal, pointer cursor 200 shown in FIG. 3A can be used to open and close windows, display pull-down menus, select elements from lists, and launch applications, for instance by accessing icons or buttons on a dock 144 or task bar.

Figure 3B:
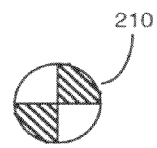
FIG. 3B is a diagram illustrating an example of a conventional wait cursor.

In FIG. 3B, a standard "busy" or "wait" cursor 210 is shown. In contrast to the pointer 200, which suggests the ability to select a user interface object by pointing to it, as well as drag the object by moving the cursor control device, the wait cursor 210 typically conveys a temporal concept to indicate that an ongoing operation has not yet been completed. While this busy state persists, the user is unable to access the functionality of the program conducting the operation. The wait cursor 210 may be animated. For instance, the wait cursor 210 of FIG. 3B may appear to rotate, to give the visual impression of a pinwheel, or clock-like motion.

The determination whether to display the normal cursor 200 or the busy cursor 210 is carried out by the cursor API 136. For example, the API might poll every running process, e.g. every application 146 that has an open window or an active icon on the dock 144. If the process does not respond within a certain amount of time, the cursor API tags the process as being in a busy state, and displays the busy icon. Alternatively, or in addition, an application 146 might declare itself to be busy, and inform the cursor API to cause the appropriate cursor image to appear.

In some operating systems the standard wait cursor 210 is universally employed for all possible wait conditions, leaving the user with the impression that no functions could be carried out while it is being displayed. With this perception, the user might mistakenly believe that the overall operating system was busy, and, therefore lose valuable time waiting for the wait cursor 210 to return to a normal cursor 200.

However, the standard wait cursor 210 can be employed in select circumstances when the foreground process is in a busy state. Typically, a computer system may have several processes running simultaneously. For example, the user could be entering text into a spreadsheet application while a word processing program is printing a text document. At the same time, a web browser might be downloading a file from the Internet. The foreground process is the process that currently has control of the computer system and receives user input, e.g. keystrokes and mouse button clicks. In the preceding example, therefore, the spreadsheet application is the foreground process. The other processes are considered to be running in the background, since they are not the focus of any user input.

One type of process, as described in the foregoing example, is an application program. Typically, when an application program is being executed, it is represented on the display 104 by means of an open window, or a button or other icon if it is in a minimized state. This icon could be a thumbnail image of the window on the dock 144. If an application is the foreground process, its window appears in the forefront of the display, and the open windows for all other applications appear behind it. Typically, the features of the foreground window, e.g. control buttons, title bar, etc., are highlighted, while those of the background windows are dimmed.

In addition to application programs, executing processes can also be associated with the computer's operating system. These processes may not have an associated window or other visible user interface element on the display. If an operating system process is in the foreground process, this condition might be apparent from the fact that the features of all open windows are dimmed.

Instead of employing the standard wait cursor universally for all possible wait conditions, a dynamically changing cursor for a user interface can be employed to communicate multiple "busy" or "wait" states, to indicate to the user specifically which application or applications are in a busy state, and to provide these distinctions as visual feedback to a user. The standard wait cursor 210 can be displayed when the operating system is busy, or when the cursor is positioned over the window or other user interface object associated with the foreground application or other process, while that process is busy. The cursor's appearance changes as it rolls over operating system elements, and windows for other non-busy applications. For example, if the cursor is not located over a window associated with the foreground process, a different form of cursor, e.g. the normal pointer cursor 200, can be displayed, even though the foreground process may still be busy. By restricting the use of the standard wait cursor 210 to circumstances in which the foreground process is busy, a user is not mistakenly inhibited from accessing other processes, e.g. other executing applications. For instance, the user might be able to move the active application to the background, to allow it to continue processing in its busy state, and interact with the operating system or other applications in the meantime.

To provide further information regarding the status of processes running on the computer, a third form of cursor can be employed. The third form of the cursor is referred to as a hybrid cursor, and consists of a portion of the image of the normal cursor, for example, the pointer portion, and a graphic. The graphic can replace a portion of the normal cursor or the graphic can be attached to the image of the normal cursor. In the latter case, the hybrid cursor can consist of the entire image of the normal cursor as the portion of the normal cursor and the graphic attached to the entire image.

Figure 3C:
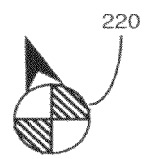
FIG. 3C is a diagram illustrating a hybrid wait cursor in accordance with an embodiment of the present invention.

FIG. 3C illustrates a hybrid wait cursor 220, or pointed wait cursor, to indicate the busy state of a background application. The hybrid wait cursor 220 is a visual combination of the normal, pointer cursor 200 and the standard wait cursor 210. In essence, the tail portion of the normal cursor 200 is replaced by the image associated with the busy state, e.g. a rotating pinwheel. This hybrid wait cursor 220 is displayed while the cursor is located over windows of background applications that are busy. The "wait" portion of the hybrid cursor, e.g. the rotating pinwheel, informs the user that the application is in a busy state. At the same time, the pointer arrow on the hybrid cursor provides an indication that some form of accessibility may be available. For instance, the user may be able to click on the window to bring it to the foreground.

If the background application is brought to the foreground while still busy, then the cursor changes to the standard wait cursor 210 shown in FIG. 3B. Both the standard wait cursor 210 and the hybrid wait cursor 220 revert back to the normal cursor 200 after the application returns from its busy state to a normal processing state. Although the cursors shown in FIGS. 3A, 3B, and 3C take on a particular form, these forms may readily be changed to other icons that enable the user to distinguish between a normal state, a busy state for the foreground process, and a busy state for a background process, respectively.

Figure 4:
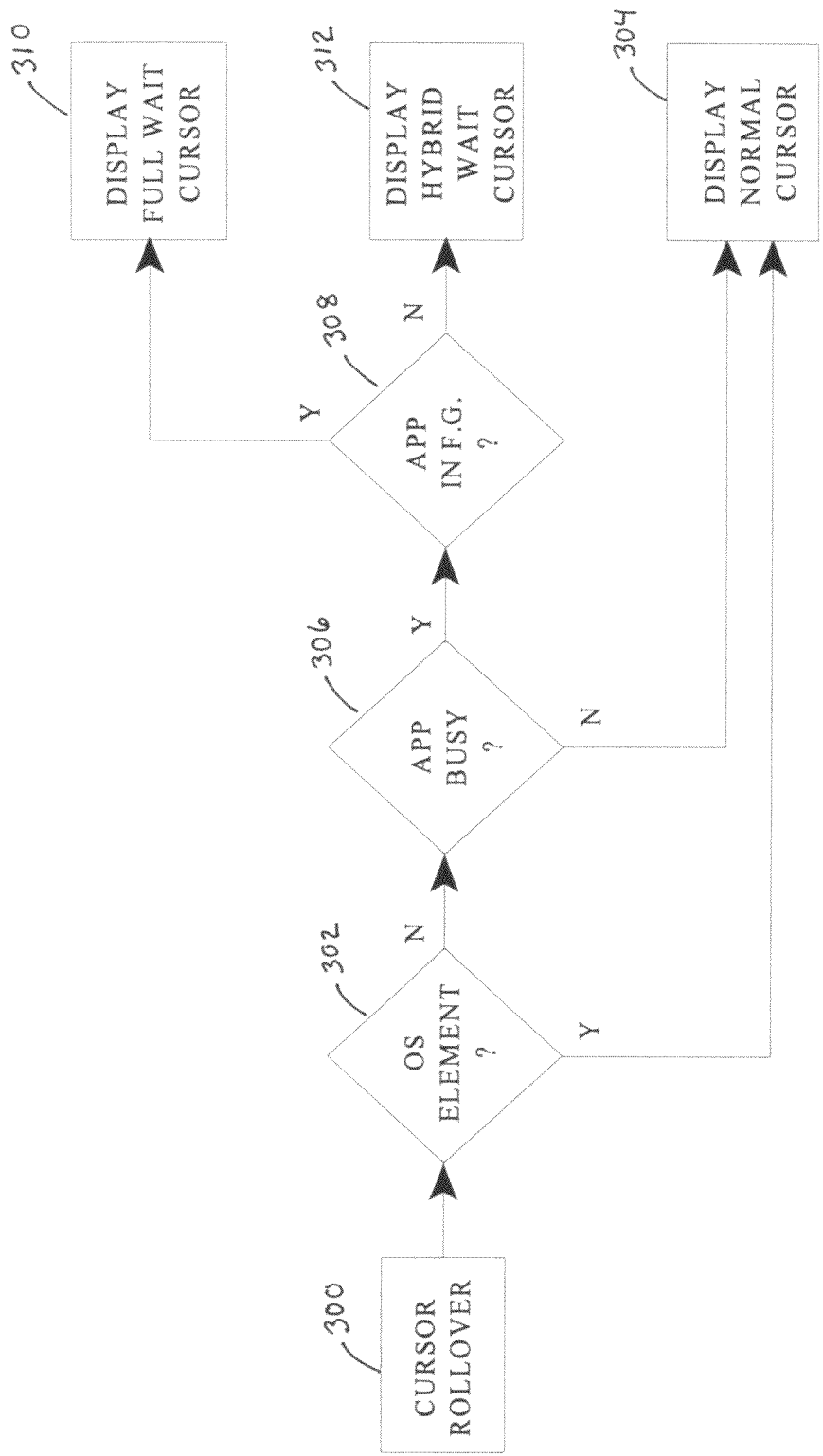
FIG. 4 is a flow diagram illustrating steps associated with dynamically determining a cursor type to be displayed.

FIG. 4 is a flow diagram illustrating the technique associated with an embodiment of the present invention. This figure is described in connection with FIGS. 5A-5D, to provide a more complete understanding of the functioning of specific embodiments of the present invention. It should be understood, however, that the specific circumstances illustrated in the screen shots of FIGS. 5A-5D are merely illustrative, and that the technique of the present invention may be implemented in a variety of other forms not shown in these figures.

The operation depicted in FIG. 4 begins as a cursor rollover event 300 is detected by the computer. In essence, the computer operating system receives a notification whenever the cursor control device 102 is moved, and adjusts the displayed position of the cursor 138 accordingly. The system also determines if the cursor's new position coincides with an element of the user interface. For instance, the operating system compares the current location of the cursor 138 with the position of windows as provided by the window manager 134, and the positions of icons as provided by an icon service (not shown). If the cursor is determined to be positioned over a different element from where it was located previously, this condition is identified as a rollover event. Once such a rollover event has been detected, a determination is made at step 302 whether the cursor has been positioned over an element of the operating system or an element of an application. If it is determined that the cursor has been moved over an operating system element, then the image for the normal pointer cursor 200 is retrieved and displayed in step 304. One example of this situation is shown in FIG. 5A.

Figure 5A:
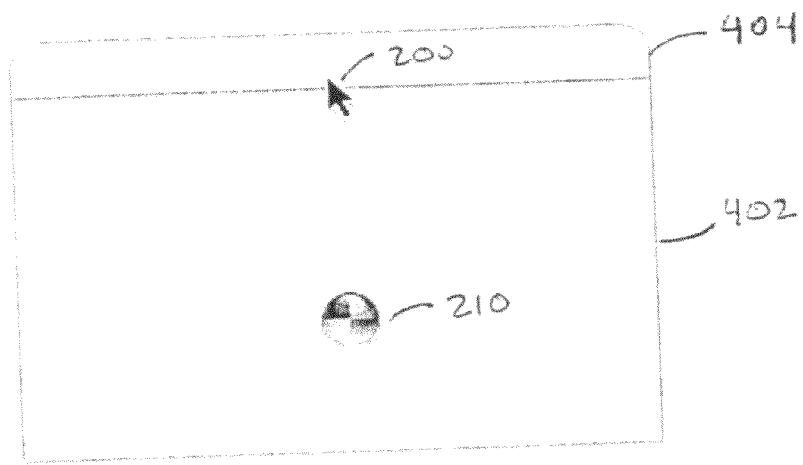
FIG. 5A is a screen shot of a dynamic cursor effect in accordance with an embodiment of the present invention.

In FIG. 5A, a window 402 associated with an application is shown. This window has standard window elements, including a title bar 404. The title bar 404 is an element of the operating system, as it is not generated by the application whose data is displayed within the window 402. Rather, it is drawn in response to calls by that application to the operating system for a standard window.

In FIG. 5A, a standard wait cursor 210 is displayed while the cursor is shown over the content area of a window 402 for a busy application. As the cursor is moved upward toward the title bar 404, it changes from the standard wait cursor 210 to the normal pointer cursor 200 once it rolls over the title bar 404. Thus, as described in connection with FIG. 4, once the cursor rollover event 300 occurs, and the cursor is positioned over an operating system element (i.e., the title bar 404), then a normal, pointer cursor 200 is displayed.

If the cursor is moved from the title bar 404 to the window area 402, another rollover event is detected. In this case, a determination is made in step 302 that the object beneath the cursor is not an operating system element. Subsequently, a further determination is made at step 306 whether the application over which the cursor is currently being displayed is busy. If it is determined in step 306 that the application displayed in the window 402 is not busy, then a normal, pointer cursor 200 is displayed, as shown in step 304. However, since the application whose data is displayed in the window 402 is busy, a further determination is made at step 308 whether the busy application is in the foreground. In the example of FIG. 5A, the window 402 is in the foreground, and therefore the image for the standard wait cursor 210 is retrieved and displayed, as shown in step 310. However, if it is determined that this busy application is not in the foreground, then the image for the hybrid wait cursor 220 is retrieved and displayed, as shown in step 312. Those skilled in the art will recognize that the order of determinations made in FIG. 4 is not crucial, and that the order may be changed without departing from the spirit of the invention.

Figure 5B:
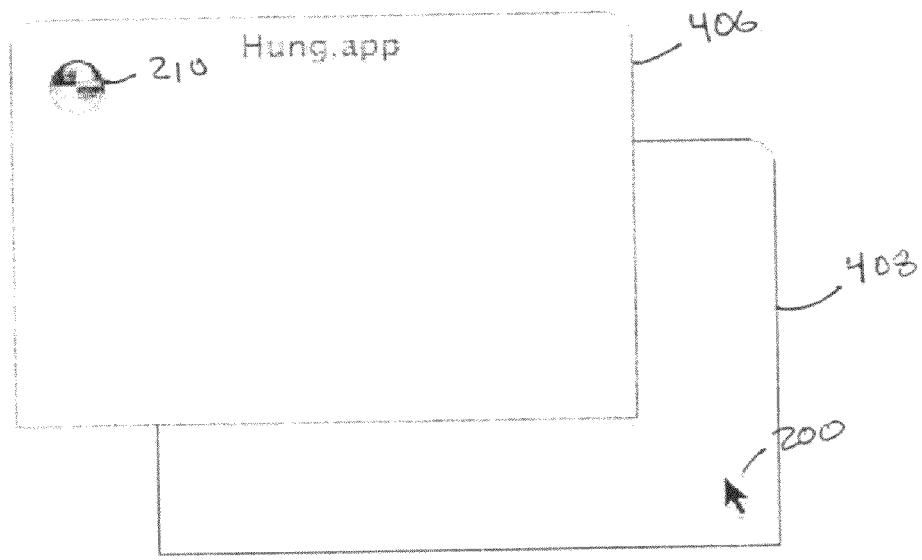
FIG. 5B is a screen shot of another dynamic cursor effect in accordance with an embodiment of the present invention.

The situation shown in FIG. 5B illustrates another situation in which a busy application, denoted as "Hung.App," is shown in a first window 406. This busy application is in the foreground, and a second application that is not busy is shown in a second window 408 in the background. While the cursor is displayed over the first window 406 of the busy foreground application, it is displayed as a standard wait cursor 210. As the cursor is rolled over the second window 408 of the non-busy application in the background, the cursor changes to a normal, pointer cursor 200 according to the technique shown in FIG. 4. Similarly, the reverse is true, and as the cursor is rolled over the busy application in the first window 406, it changes to the form of the standard wait cursor 210. Clicking on the window 408, while the cursor 200 is over that window, will bring the application to the foreground, moving the busy application "Hung.App" shown in window 406 to the background, as depicted in FIG. 5C.

Figure 5C:
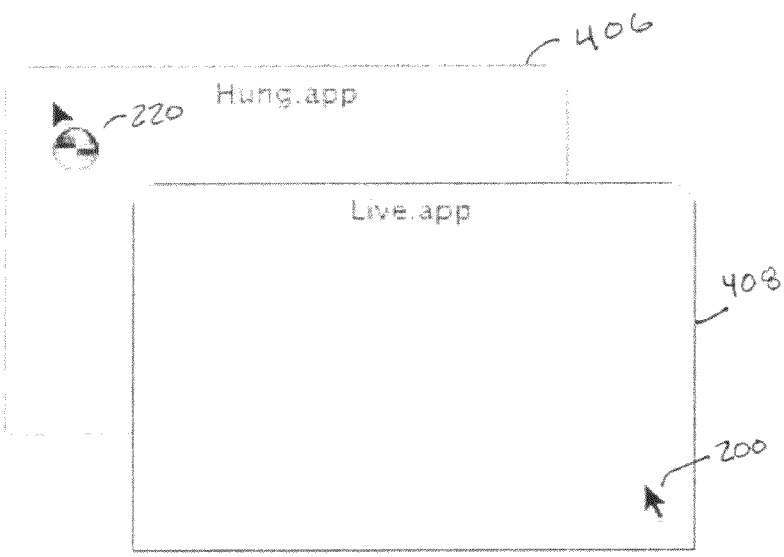
FIG. 5C is a screen shot of a further dynamic cursor effect in accordance with an embodiment of the present invention.

In FIG. 5C, the application now shown in the foreground window 408, denoted as "Live.App," is not currently busy. A normal, pointer cursor 200 is displayed over the window 408 containing this non-busy application, according to the technique shown in FIG. 4. As the cursor is moved over the window 406 containing the busy application "Hung.App," the hybrid wait cursor 220 is displayed, as described in step 312 of FIG. 4. By displaying a hybrid wait cursor 220, the user is informed that the application displayed in the background window 406 is in a busy state. However, because of the hybrid nature of the cursor 220, the user also understands that operations with respect to other applications or the operating system may be performed using the cursor control device.

Figure 5D:
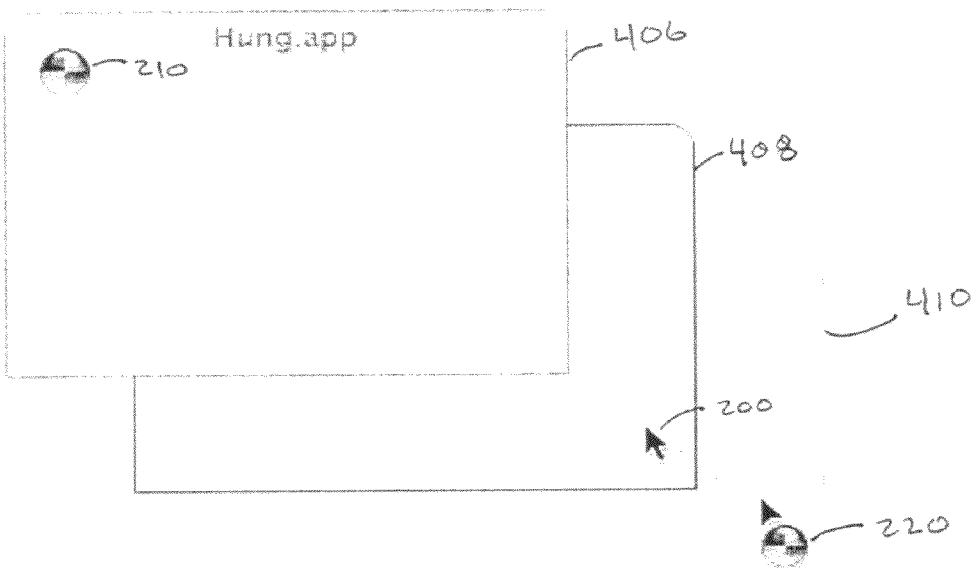
FIG. 5D is a screen shot of another dynamic cursor effect in accordance with an embodiment of the present invention.

The situation shown in FIG. 5D illustrates each of the various cursor images that may be displayed in the illustrative embodiment, depending on their screen location relative to various windows containing applications that are either in a busy state or non-busy state. In FIG. 5D, the window 406 shown in the foreground contains a busy application, denoted "Hung.App," and windows 408 and 410 are shown in the background. The application displayed within the bottom window 410 is also busy, while the application displayed in the middle window 408 is in a non-busy state. Thus, while the cursor is located over the busy active application in window 406, it is displayed as the standard wait cursor 210. As the cursor control device is used to move the cursor to a position over the middle window 408 containing the non-busy application "Live.App," the cursor is changed and displayed as a normal, pointer cursor 200. By displaying the normal cursor 200, the user is informed that the application in this window is not busy, and its functionality can be accessed immediately. Similarly, as the cursor is positioned over the busy application in the bottom window 410, the cursor is changed to a hybrid wait cursor 220, indicating to a user that the background application is busy and may or may not respond, but that operations on other applications, or the operating system, can still be performed.

Thus, in accordance with this aspect of the present invention, the user is alerted to the fact that, while the foreground application shown in the top window 406 is busy, other applications and operating system functionalities can be accessed. Specifically, the pointer cursor 200 shown over the middle window 408 indicates that the functions of the application within the middle window 408 can be accessed at any time. Additionally, the hybrid wait cursor 220, displayed to the user as the cursor is moved over the busy application contained within the bottom window 410, indicates to the user that the background application shown in this window is in a busy state, and may or may not respond to cursor control device commands, such as mouse clicks and the like. Due to the ability to convey information regarding an application's busy or non-busy state under a variety of circumstances, the user is provided with a greater amount of information regarding the current state of the computer system, by way of the GUI.

The examples of FIGS. 5A-5D illustrate the dynamic variation of the cursor in dependence upon its location relative to windows associated with various applications. This functionality is not limited to open windows, however. In accordance with a further feature of the invention, the wait cursor is displayed whenever the cursor is positioned over any representation of an application that is in a busy state. For instance, a user may place a copy of an application's icon on the desktop, to enable the application to be easily launched. In the Windows® operating system provided by Microsoft Corporation, executing applications are represented by buttons on a task bar at one edge of the display. In the Mac OS®, the user can place icons in the dock 144 for quick launching, and a minimized window of an application is presented on the dock as a thumbnail image. In accordance with a preferred embodiment of the present invention, if the cursor is positioned over any of these forms of representation of an application that is currently in a busy state, the wait cursor is displayed. Thus, it is not necessary for the user to open a window for an application to determine whether it is in a busy state.

In the implementation of this latter aspect of the invention, it may not be necessary to employ both the standard busy cursor 210 and the hybrid wait cursor 220 when the cursor is positioned over a representation of an application, to distinguish between foreground and background applications, respectively. For purposes of simplicity, it may be sufficient to employ only the normal pointer cursor 200 and the standard wait cursor 210. In this case, the cursor appearance toggles between these two images, in dependence upon whether the cursor is positioned over an object, i.e. a window, an icon, a button, a thumbnail image, etc., that is associated with a busy application or an application in a ready state.

Figure 6:
FIG. 6 is an illustration of a hybrid cursor for indicating that an object will be deleted.

In addition to distinguishing between foreground applications and background application that are busy, different forms of hybrid cursors can be employed to convey other types of information to users. In some circumstances, a drag operation could result in an object being deleted. For instance, if a user drags in icon off the dock 144, or drags a button off a tool bar and then releases it, that object will be deleted from the dock or tool bar. If the user's intention was to reposition the object, rather than delete it, the drag operation will produce an undesirable result. FIG. 6 illustrates a hybrid cursor that can be employed to indicate that an item being dragged will be deleted if it is released. In this example, the tail of the normal cursor is replaced by an image of a puff of smoke, to represent disappearance of the object. Other images that portray the deletion of an object can be employed as well.

In operation, the user can drag an object with the normal cursor, or a drag cursor as described hereinafter. If the dragged object reaches a location where releasing it could result in deletion, such as outside the region of the dock 144, the cursor image changes to the hybrid image of FIG. 6. With this type of feedback, the user can make an informed decision whether to continue dragging or to return the object to the dock.

Figure 7A:
FIGS. 7A-7C are illustrations of a hybrid cursor for indicating that multiple objects are being dragged.
Figure 7B:

FIG. 7A illustrates an example of a hybrid cursor that can be used to identify a drag operation. In this example, the tail of the normal cursor is replaced with a bubble that can have a distinctive color that the user learns to associate with a drag operation, e.g. red. Quite often, a drag operation may involve multiple objects. For instance, the user might select all of the files in a music folder and drag them to a disc icon. The bubble of the hybrid drag cursor contains a value that identifies the number of objects being dragged. In the example of FIG. 7A, that value is a two-digit number that fits within a circular bubble. If a larger number of objects are being dragged, that value might not easily fit within a circular bubble. In such a case, the bubble expands to accommodate the number. FIG. 7B illustrates an elongated bubble containing a 4-digit value. The size of the bubble can be determined by specifying a predetermined space, e.g. 6 pixels, that is to appear between the left and right edges of the bubble and the beginning and end of the number, respectively.

Figure 7C:

In some cases, the user may desire to know alternative information about the objects being dragged. For instance, the cumulative size of files being dragged may be of interest, to determine whether they will fit on a disk or in an e-mail message having limited capacity. This alternative information can be obtained by pressing a designated key, e.g. the Control key, while the drag operation is being carried out. Additionally, or alternatively, any other suitable indication means other than a designated key can be employed. Moreover, the type of information which is displayed when objects are dragged or the type of alternative information which is displayed can be based on a preference set by a user via an appropriate mechanism, such as, for example, a system preference menu or operating system control panel. FIG. 7C illustrates an example of a cursor that can be displayed when the designated key is pressed. This form of the hybrid drag cursor contains a value that indicates the total size of all files being dragged. Again, the width of the bubble expands to accommodate the size value.

Figure 8A:
FIGS. 8A-8C are illustrations of a hybrid cursor for indicating that an object will be copied.

A different form of hybrid cursor can be associated with a copy operation. FIG. 8A illustrates one example of such a cursor. In this example, the tail of the normal cursor is again replaced with a bubble. However, the bubble has a "plus" sign within it, to indicate that a copy of the dragged object will be made. In addition, the bubble preferably has a distinctly different color from that of the hybrid drag icon, such as green. As a result, the user can readily distinguish between drag operations that will cause an object to be moved from one location to another, and drag operations that will result in a copy of the object being made.

Figure 8B:

The hybrid cursor of FIG. 8A might be employed when a single object is to be copied. If multiple objects are being dragged to a copy destination, the bubble can include a value that indicates the number of objects to be copied. FIG. 8B illustrates an example of such a cursor. In operation, when a user selects and begins to drag multiple objects, the hybrid cursor of FIG. 7A is first displayed. As soon as the pointer portion of the cursor rolls over an object that constitutes a copy destination, the cursor appearance changes to that of FIG. 8B. In so doing, the cursor changes color, e.g. from red to green, and the "plus" sign appears, to provide a clear indication that the objects being dragged will be copied to the destination if the user released the cursor at that point. In addition, the width of the bubble increases, to provide adequate space to accommodate the addition of the "plus" sign.

Figure 8C:

As with the hybrid drag cursor, the copy cursor can also be modified by pressing a key to display alternative information, such as the total size of the objects being copied as illustrated in FIG. 8C.

From the foregoing, it can be seen that the present invention provides a dynamically changing cursor for a user interface, such as a graphical user interface. This functionality is achieved by storing a plurality of cursor images that are respectively associated with different conditions, determining the current condition associated with a user interface element over which the cursor is positioned, and displaying the appropriate one of the stored images. In one embodiment of the invention, a user can determine by way of a simple mouse rollover event whether an application is busy. Additionally, the user is given different indications in dependence upon whether a busy application is in the foreground or in the background. Additionally, the cursor returns to a normal state when interacting with operating system elements, such as title bars, pull-down menus, and the like. Therefore, regardless of the busy state of any application, a user may interact with the operating system's GUI, and perform such functions as moving and/or resizing windows, executing commands, or the like.

In another aspect of the invention, the dynamically changing cursor has an appearance which is a hybrid of a standard pointer cursor and a graphic that provides meaningful feedback to the user. The pointer portion of the hybrid cursor conveys to the user that the cursor can be employed in the conventional manner to select and drag objects. The graphic can be used to convey information such as a busy state, or the result of a drag operation. Furthermore, by including quantitative data within the graphic, the user is provided with additional information regarding a drag operation being performed.

It will be appreciated by those of ordinary skill in the art that the present invention can be embodied in other specific forms without departing from the spirit or essential characteristics thereof. For example, while the invention has been described in the context of the Mac OS®, the present invention can find utility within any operating system having a graphical user interface that makes use of cursors controlled by way of cursor control devices such as a computer mouse, a track ball, an electronic stylus, or the like.

The presently disclosed embodiments are, therefore, considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A non-transitory computer-readable recording medium having a computer program recorded thereon that causes a computer to control a display device to display a user interface and at least two different images of a cursor within the displayed user interface, the computer program causing the computer to perform operations comprising:

displaying, in the user interface on the display device, a first image of the cursor, the first image of the cursor comprising a pointer arrow having a tail;

receiving a control input containing an instruction to drag at least one object displayed in the user interface on the display device;

controlling the display device to, upon receipt of the control input, switch the display of the first image of the cursor to a display of a second image of the cursor in the user interface, the second image of the cursor comprising a first hybrid cursor having a pointer arrow with a first variable graphic replacing the tail comprised in the first image;

controlling the display device to display, while the at least one object is being dragged, the first variable graphic in the user interface as an alphanumeric representation including a numerical value representing a characteristic of the at least one dragged object; and in response to a user indication associated with the dragging, controlling the display device to switch the display of the second image of the cursor to include alternative information different from the numerical value representing said characteristic of the at least one dragged object.

2. The computer-readable recording medium of claim 1, wherein the computer program causes the computer to perform further operations comprising:

determining when the first image of the cursor is positioned in the user interface over an object that is associated with an application in a busy state;

controlling the display device to switch the display of the first image of the cursor to a display of a third image of the cursor in the user interface, upon determining that the first image of the cursor is positioned over the user interface object associated with the application in the busy state, the third image of the cursor comprising a second hybrid cursor having a pointer arrow and a second variable graphic replacing the tail comprised in the first image of the cursor; and controlling the display device to, while the cursor is positioned over the user interface object associated with the application in the busy state, display the second variable graphic of the third image of the cursor as a representation of the busy state of the application in the busy state.

3. The computer-readable recording medium of claim 1, wherein the computer program causes the computer to perform further operations comprising:

determining when the second image of the cursor is positioned in the user interface over a destination object to which the at least one dragged object is to be copied; and controlling the display device to switch the display of the second image of the cursor to the display of a third image of the cursor in the user interface, upon determining that the second image of the cursor is positioned over the destination object to which the at least one dragged object is to be copied, wherein of the third image of the cursor includes a graphic that represents a copy operation.

4. The computer-readable recording medium of claim 3, wherein the first variable graphic of the second image of the cursor has a first color, and the graphic of the third image of the cursor has a second color different from the first color.

5. The computer-readable recording medium of claim 3, wherein the numerical value represented in the first variable graphic of the second image of the cursor represents one of a number of objects contained in the at least one dragged object and a cumulative data size of the at least one dragged object.

6. The computer-readable recording medium of claim 5, wherein the graphic of the third image of the cursor includes the numerical value.

7. The computer-readable recording medium of claim 6, wherein the numerical value represented in the graphic of the third image of the cursor represents one of a number of objects being copied, and a cumulative data size of the number of objects being copied.

8. The computer-readable recording medium of claim 1, wherein the numerical value indicates a number of objects contained in the at least one dragged object.

9. The computer-readable recording medium of claim 1, wherein the numerical value indicates a cumulative size of the at least one dragged object.

10. The computer-readable recording medium of claim 1, wherein the first variable graphic of the second image of the cursor comprises a geometric object, and the size of the geometric object is dynamically varied to accommodate the numerical value.

11. The computer-readable recording medium of claim 1, wherein the first variable graphic of the second image of the cursor indicates that the at least one dragged object will be deleted.

12. A method for displaying a user interface and at least two different images of a cursor within the displayed user interface on a display device of a computer, comprising the steps of:

displaying, in the user interface on the display device, a first image of the cursor, the first image of the cursor comprising a pointer arrow having a tail;

receiving, from a control device connected to the computer, a control input containing an instruction to drag at least one object in the user interface displayed on the display device;

controlling the display device to, upon receipt of the control input, switch the display of the first image of the cursor to a display of a second image of the cursor in the user interface, the second image of the cursor comprising a first hybrid cursor having a pointer arrow with a first variable graphic replacing the tail comprised in the first image of the cursor;

controlling the display device to display, while the at least one object is being dragged, the first variable graphic in the user interface as an alphanumeric representation including a numerical value representing a characteristic of the at least one dragged object; and in response to a user indication associated with the dragging, controlling the display device to, switch the display of the second image of the cursor to include alternative information different from the numerical value representing said characteristic of the at least one dragged object.

13. The method of claim 12, comprising:

determining when the first image of the cursor is positioned in the user interface over an object that is associated with an application in a busy state;

controlling the display device to switch the display of the first image of the cursor to a display of a third image of the cursor in the user interface, upon determining that the first image of the cursor is positioned over the user interface object associated with the application in the busy state, the third image of the cursor comprising a second hybrid cursor having a pointer arrow and a second variable graphic replacing the tail comprised in the first image of the cursor; and controlling the display device to, while the cursor is positioned over the user interface object associated with the application in the busy state, display the second variable graphic of the third image of the cursor as a representation of the busy state of the application in the busy state.

14. The method of claim 12, further comprising:

determining when the second image of the cursor is positioned in the user interface over a destination object to which the at least one dragged object is to be copied; and controlling the display device to switch the display of the second image of the cursor to the display of a third image of the cursor in the user interface, upon determining that the second image of the cursor is positioned over the destination object to which the at least one dragged object is to be copied, wherein the third image of the cursor includes a graphic that represents a copy operation.

15. The method of claim 14, wherein the first variable graphic of the second image of the cursor has a first color, and the graphic of the third image of the cursor has a second color different from the first color.

16. The method of claim 14, wherein the numerical value represented in the first variable graphic of the second image of the cursor represents one of a number of objects contained in the at least one dragged object and a cumulative data size of the at least one dragged object.

17. The method of claim 16, wherein the graphic of the third image of the cursor includes the numerical value.

18. The method of claim 17, wherein the numerical value represented in the graphic of the third image of the cursor represents one of a number of objects being copied, and a cumulative data size of the number of objects being copied.

19. The method of claim 12, wherein the numerical value indicates a number of objects contained in the at least one dragged object.

20. The method of claim 12, wherein the numerical value indicates a cumulative size of the at least one dragged object.

21. The method of claim 18, wherein the first variable graphic of the second image of the cursor comprises a geometric object, and wherein the method further includes the step of dynamically varying the size of the geometric object to accommodate the numerical value.

22. The method of claim 12, wherein the first variable graphic of the second image of the cursor indicates that the at least one dragged object will be deleted.

23. A method for displaying a user interface and at least two different images of a cursor within the displayed user interface on a display device of a computer, comprising the steps of:

displaying, in the user interface on the display device, a first image of the cursor;

receiving, from a control device connected to the computer, a control input containing an instruction to drag at least one object displayed in the user interface on the display device;

controlling the display device to, upon initiation of the dragging of the at least one object displayed in the user interface, switch the display of the first image of the cursor to a display of a second image of the cursor in the user interface, the second image of the cursor comprising a first hybrid cursor having a portion of the first image of the cursor and a first variable graphic;

controlling the display device to display, while the at least one object is being dragged, the first variable graphic in the user interface as a symbol representation display including a numerical value representing a characteristic of the at least one dragged object; and in response to a user indication associated with the dragging, controlling the display device to, switch the display of the second image of the cursor to include alternative information different from the numerical value representing said characteristic of the at least one dragged object.

24. The method of claim 23, comprising:

determining when the first image of the cursor is positioned in the user interface over an object that is associated with an application in a busy state;

controlling the display device to switch the display of the first image of the cursor to a display of a third image of the cursor in the user interface, upon determining that the first image of the cursor is positioned over the user interface object associated with the application in the busy state, the third image of the cursor comprising a second hybrid cursor having a first portion of the first image of the cursor and a second variable graphic replacing a second portion of the first image of the cursor; and controlling the display device to, while the cursor is positioned over the user interface object associated with the application in the busy state, display the second variable graphic of the third image of the cursor as a representation of the busy state of the application in the busy state.

25. The method of claim 23, further comprising:

determining when the second image of the cursor is positioned in the user interface over a destination object to which the at least one dragged object is to be copied; and controlling the display device to switch the display of the second image of the cursor to the display of a third image of the cursor in the user interface, upon determining that the second image of the cursor is positioned over the destination object to which the at least one dragged object is to be copied, wherein the graphical representation in the third image of the cursor includes a graphic that represents a copy operation.

26. The method of claim 25, wherein the first variable graphic of the second image of the cursor has a first color, and the graphic of the third image of the cursor has a second color different from the first color.

27. The method of claim 25, wherein the graphic of the third image of the cursor includes the numerical value represented in the first variable graphic of the second image of the cursor, and wherein the numerical value represented in the graphic of the third image of the cursor represents one of a number of objects being copied and a cumulative data size of the number of objects being copied.

28. The method of claim 27, wherein the numerical value represented in the graphic of the third image of the cursor represents one of a number of objects being copied and a cumulative data size of the number of objects being copied.

29. The method of claim 23, wherein the numerical value indicates a number of objects contained in the at least one dragged object.

30. The method of claim 23, wherein the numerical value indicates a cumulative size of the at least one dragged object.

31. The method of claim 28, wherein the first variable graphic of the second image of the cursor comprises a geometric object, and wherein the method further includes the step of dynamically varying the size of the geometric object to accommodate the quantitative value.

32. The method of claim 23, wherein the first variable graphic of the second image of the cursor indicates that the at least one dragged object will be deleted.

33. A computer processing device comprising:
a display unit configured to display a user interface and at least two different images of a cursor within the user interface;
a control unit configured to control the display unit to display a first image of the cursor within the user interface, the first image of the cursor comprising a pointer arrow having a tail; and
a receiving unit configured to receive an instruction input containing an instruction to drag at least one object displayed in the user interface on the display unit,
wherein the control unit is configured to control the display device to switch the display of the first image of the cursor to a display of a second image of the cursor within the user interface, upon the receiving unit receiving the instruction input, the second image of the cursor comprising a first hybrid cursor having a pointer arrow with a first variable graphic replacing the tail comprised in the first image of the cursor,
wherein the control unit is configured to control the display device to display, while the at least one object is being dragged, the first variable graphic in the user interface as an alphanumeric representation including a numerical value representing a characteristic of the at least one dragged object, and
wherein, in response to a user indication associated with the drag operation, the control unit is configured to control the display device to switch the display of the second image of the cursor to include alternative information different from the numerical value representing said characteristic of the at least one dragged object.

34. The computer processing device of claim 33, wherein the control unit comprises a determining unit configured to determine when the first image of the cursor is positioned in the user interface over an object that is associated with an application in a busy state,
wherein the control unit is configured to control the display unit to switch the display of the first image of the cursor to a display of a third image of the cursor, upon the determining unit determining that the first image of the cursor is positioned over the object that is associated with the application in the busy state, the third image of the cursor comprising a second hybrid cursor having a pointer arrow and a second variable graphic replacing the tail comprised in the first image of the cursor, and
wherein the control unit is configured to control the display device to display, when the determining unit determines that the first image of the cursor is positioned over the object that is associated with the application in the busy state, the second variable graphic of the third image of the cursor as a representation of the busy state of the application in the busy state.

35. The computer processing device of claim 33, wherein the control unit comprises a determining unit configured to determine when the second image of the cursor is positioned in the user interface over a destination object to which the at least one dragged object is to be copied,
wherein the control unit is configured to control the display unit to switch the display of the second image of the cursor to a display of a third image of the cursor, upon the determining unit determining that the second image of the cursor is positioned over the destination object to which the at least one dragged object is to be copied, and
wherein the third image of the cursor includes a graphic that represents a copy operation.

36. The computer processing device of claim 35, wherein the control unit is configured to control the display unit to display the first variable graphic of the second image of the cursor to have a first color, and to display the graphic of the third image of the cursor to have a second color different from the first color.

37. The computer processing device of claim 35, wherein the control unit is configured to control the display unit to display the graphic of the third image of the cursor to include the numerical value represented in the first variable graphic of the second image of the cursor,
wherein the control unit is configured to control the display unit to display the numerical value represented in the graphic of the third image of the cursor as one of a number of objects being copied and a cumulative data size of the number of objects being copied.

38. The computer processing device of claim 33, wherein the control unit is configured to control the display unit to display the numerical value to indicate a number of objects contained in the at least one dragged object.

39. The computer processing device of claim 33, wherein the control unit is configured to control the display unit to display the numerical value to indicate a cumulative data size of the at least one dragged object.

40. The computer processing device of claim 33, wherein the control unit is configured to control the display unit to display the first variable graphic of the second image of the cursor to comprise a geometric object, and
wherein the control unit is configured to control the display unit to dynamically vary the size of the geometric object to accommodate the numerical value.

41. The computer processing device of claim 33, wherein the control unit is configured to control the display unit to display the first variable graphic of the second image of the cursor to indicate that the at least one dragged object will be deleted.

* * * * *